Figure 1:
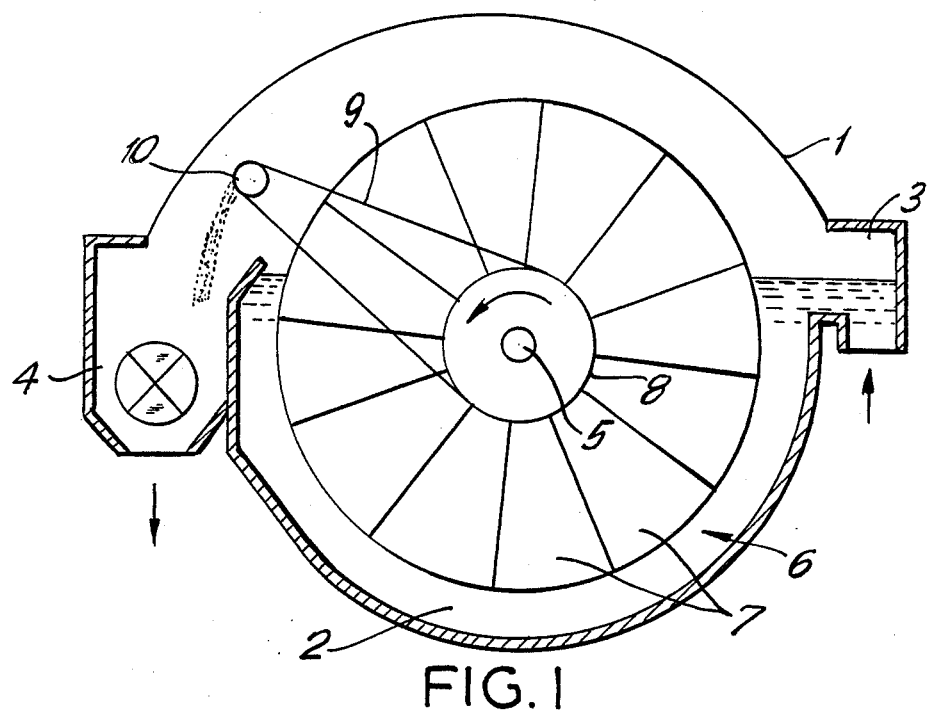

United States Patent [19]

Kohonen

[11] Patent Number: 4,943,372

[45] Date of Patent: Jul. 24, 1990

[54] METHOD AND APPARATUS OF DISCHARGING A DISC FILTER

[75] Inventor: Raimo Kohonen, Savonlinna, Finland

[73] Assignee: A. Ahlstrom Corporation, Noormarkku, Finland

[21] Appl. No.: 265,691

[22] Filed: Nov. 1, 1988

[30] Foreign Application Priority Data

Nov. 2, 1987 [FI] Finland ................. 874800

[51] Int. Cl.⁵ .............. B01D 33/23; B01D 33/46
[52] U.S. Cl. ....................... 210/324; 210/327; 210/330; 210/331; 210/391; 210/396; 162/380
[58] Field of Search ........... 210/324, 327, 330, 331, 210/332, 334, 346, 347, 391, 396; 162/56, 380

[56] References Cited

U.S. PATENT DOCUMENTS

| | | | |
|---|---|---|---|
| 1,283,925 | 11/1918 | Salisbury | 210/331 |
| 3,030,080 | 4/1962 | Hise et al. | 210/526 |
| 3,959,145 | 5/1976 | Lundquist et al. | 210/223 |
| 4,086,168 | 4/1978 | Moore | 210/330 |
| 4,321,140 | 3/1982 | Luthi | 210/327 |

FOREIGN PATENT DOCUMENTS 72431 2/1987 Finland .

Primary Examiner—W. Gary Jones
Assistant Examiner—Matthew O. Savage
Attorney, Agent, or Firm—Toren, McGeady & Associates

[57] ABSTRACT

The present invention relates to a method and apparatus for discharging a disc filter. The method and apparatus are excellent for handling fiber suspensions in the pulp and paper industry. In earlier known means, the filter cake thickened on the filter surfaces of the disc filter is detached by means of water or compressed-air jets and the cake allowed to freely fall to an axial chute disposed below the shaft level of the filter, wherefrom the pulp most usually is transferred by means of a screw conveyor. The pulp, however, easily clogs the inlet opening of the chute, whereby pulp material accumulates in the space between the discs with harmful consequences. The above-mentioned problem is solved by arranging a conveying means (9), preferably a belt conveyor, between and/or adjacent the filter discs (6), onto which conveying means the cakes are allowed to fall freely and wherefrom the belt (9) quickly and in a forced or positive manner transfers the cakes further to a discharge chute (4) disposed on the side of the filter, thus preventing the pulp material from accumulating between the discs.

4 Claims, 1 Drawing Sheet

METHOD AND APPARATUS OF DISCHARGING A DISC FILTER

The present invention relates to a method and apparatus for discharging a disc filter, thereby improving the reliability of the disc filter and increasing its filtering capacity. The method and apparatus according to the invention are excellent for thickening fiber suspensions in the pulp and paper industry.

Conventional disc filters to the prior art comprise, as is well-known, radial filter discs constructed by adjoining two filter surfaces in such a manner that it is possible to provide a suction effect therebetween, by means of which suction effect liquid is drained off from the material to be thickened. Furthermore, such discs are divided into a plurality, normally eight or more, of sectors which are separated from one another so as to enable each sector to be provided either with underpressure or overpressure. The disc filter itself is constructed of a plurality of such disc elements assembled on a common shaft, the assembly being rotatably arranged in a pulp vat, where the elevation of pulp is such that it covers about 60% of the diameter of the discs.

The function of the apparatus is such that the sectors submerged in the pulp suspension are subjected to an underpressure, i.e. air is drawn out of said sectors, whereby liquid absorbs thereinto replacing the air and pulp starts to accumulate onto the filter surface. When the discs rotate, the filter cake becomes thicker on the filter surfaces until each sector in turn rises above the surface of the suspension, and a pressure lower than the external pressure still prevails inside the filter surfaces for a while, further thickening the filter cake. When the sector turns higher up, the filter cake is detached from the filter surfaces by directing a water jet or a compressed-air jet to the joining point of the cake and the filter surface, whereby the cake becomes detached in a form of a plate. At the next stage, pressurized liquid is fed into the sector for cleansing the openings of the filter surface.

The filter cake detached as described above falls freely to a chute disposed in the space between adjacent disc elements At the bottom of the chute there is most usually disposed a screw conveyor, which transfers thickened pulp forward and breaks the filter cakes to form a more even pulp flow. The above described method of discharging a filter disc, however, contains some drawbacks. Firstly, because the filter cakes of two opposite filter discs are detached simultaneously, it is possible that the cakes, when falling to the chute, will clog the chute, thereby preventing any further pulp from entering it and consequently, the next detached filter cakes are discharged either on top of the filter shaft or, from the opposite side of the chute, back to the vat. Secondly, it is possible that the filter cake does not become entirely detached from the filter surface but remains partly stuck to it, whereby its falling to the chute is obstructed and it passes the chute. Thirdly, detaching of the filter cake is normally started when the sector to be emptied is at its top dead center, i.e. when approximately 60 degrees or less of the sector has risen from the pulp vat. Thereby, plenty of the available filtering time above the suspension surface is wasted because one has to try to make sure of the detachment of the filter cake.

In order to eliminate or minimize the above-mentioned drawbacks, a method according to the invention has been developed for discharging a disc filter, said method being characterized in that the filter cake is dropped onto a continuously moving transport means, by which the detached pulp is transferred for further treatment.

A discharge means for a disc filter, according to the invention, is characterized in that between disc elements or adjacent an element is disposed a transport means, which takes the filter cake to a transfer chute for further transport.

The invention provides, for example, the following advantages:

A filter cake detached from the filter surfaces is prevented from clogging the discharge space because it is immediately taken away from the space between the disc elements For a corresponding reason, the filter cake is also prevented from being discharged on top of the filter shaft, where it could penetrate sealing slots or bearings, and from accumulating on top of a discharge plate, which is in some cases disposed above the shaft, on which plate pulp has found to form a high stack, which obstructs the detachment of filter cakes from the filter surfaces.

Because of reliable transfer of the filter cake the detachment of said cake may be postponed and consequently, the sectors above the suspension surface can be used more efficiently for draining liquid off of the filter cake.

Figure 2:
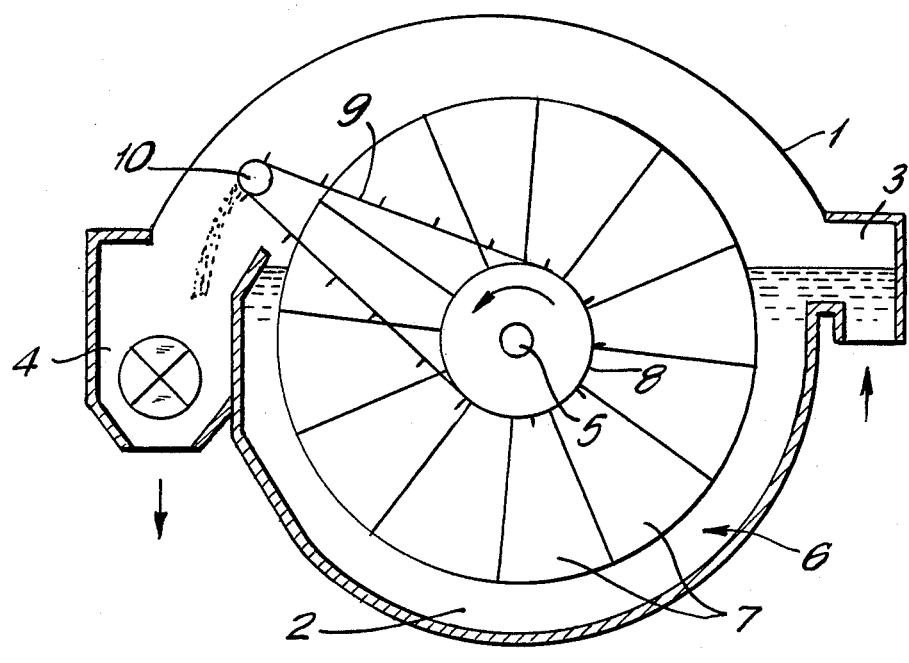

The method and apparatus according to the invention will be described more in detail below with reference to the accompanying drawing, of which FIG. 1 is a schematic side view of a preferred embodiment illustrating a disc filter cross-sectioned between two disc elements and FIG. 2 is a side view of another embodiment of the invention.

A disc filter is illustrated in FIG. 1 the drawing and mainly comprises an external shell 1, the lower part of which serves as a pulp vat 2, a pulp feed conduit 3, a discharge chute 4 for thickened pulp and rotary filter disc elements 6 disposed inside the shell 1 and arranged rotatable on a shaft 5; each of said filter disc elements being divided into hollow sectors 7 which are provided with a filter surface, each filter disc element in the case illustrated in the drawing containing 12 sectors. In accordance with a preferred embodiment of the invention, the filter shaft 5 is provided with a belt pulley 8, around of which a conveyor belt 9 rotates and is so arranged so as to receive and transfer the filter cakes otherwise detached from the filter surfaces to the discharge chute 4, above which is disposed a sheave 10 for the belt conveyor. Preferably the belt conveyor is driven by the shaft of the filter itself, whereby no other drive is needed. However, it is possible to arrange the drive of the conveyor also from the end of the sheave 10, whereby the belt pulley 8 at the opposite end must be mounted on bearings to the shaft 5.

It is naturally possible to arrange the route of the conveyor belt in many different ways. It may be arranged to be driven by separate sheaves and drive reels or by the shaft of the filter itself as shown in the drawing. It is also to be noted that the conveyor may be of some other type than a belt conveyor. Various lug conveyors, vibrating conveyors, an upwardly open screw conveyor or some other equivalent means can be considered, even pressure medium blasting by means of which lumpy and thick pulp can be transferred. FIG. 2 illustrates an embodiment of the invention wherein the conveyor belt 9 is a lug conveyor. The most important feature of the invention is that the pulp material detached from the filter surfaces is removed in a forced or positive physical manner from between the filter disc elements in order to prevent it from forming clogs or equivalent barriers obstructing the function of the apparatus.

It will be understood from what has been described above that a completely new method and apparatus for discharging a disc filter has been developed. As stated above, the apparatus according to the invention may differ considerably from the embodiment described above, yet not deviating from the inventive scope presented in the accompanying claims, which define the protective scope and extent of our invention.

We claim:

1. A discharge means for a disc filter used for treatment for fiber suspensions in the pulp industry, said disc filter comprising a plurality of disc elements (6) disposed adjacently on a common shaft (5), said disc elements comprising a plurality of sectors and filter surfaces arranged on top of said sectors, the discharge means comprising movable conveying means disposed between the disc elements (6) for transferring filter cakes detached from the filter surface to a discharge member (4) disposed outside the circumference of the filter disc elements, said conveying means including a belt conveyor (9), one sheave (8) disposed on the common shaft (5), and another sheave (10) arranged above the discharge member (4), the belt conveyor (9) being arranged so as to encompass both the one sheave and the another sheave.

2. A discharge means as claimed in claim 1, wherein the belt conveyor (9) is driven by the shaft (5) through the one sheave (8).

3. A discharge means claimed in claim 1, and further comprising power source means, separate from the common shaft, for driving the belt conveyor.

4. A discharge means for a disc filter used for treatment of fiber suspensions in the pulp industry, said disc filter comprising a plurality of disc elements (6) disposed adjacently on a common shaft (5), said disc elements comprising a plurality of sectors and filter surfaces arranged on top of said sectors, the discharge means comprising a movable lug conveyor disposed between the disc elements (6) for transferring filter cakes detached from the filter surfaces to a discharge member (4) disposed outside the circumference of the filter discs.

* * * * *